United States Patent
Foss et al.

(10) Patent No.: US 10,315,340 B2
(45) Date of Patent: Jun. 11, 2019

(54) METHODS AND SYSTEMS FOR MODELING OF DISTORTION IN MOLDED COMPOSITES

(71) Applicant: GM GLOBAL TECHNOLOGY OPERATIONS LLC, Detroit, MI (US)

(72) Inventors: Peter H. Foss, Oxford, MI (US); Jorge F. Arinez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 637 days.

(21) Appl. No.: 15/082,984

(22) Filed: Mar. 28, 2016

(65) Prior Publication Data

US 2016/0325468 A1      Nov. 10, 2016

Related U.S. Application Data

(60) Provisional application No. 62/158,961, filed on May 8, 2015.

(51) Int. Cl.

| | |
|---|---|
| *B29C 33/38* | (2006.01) |
| *G06F 17/50* | (2006.01) |
| *B29C 70/46* | (2006.01) |
| *B29K 105/08* | (2006.01) |
| *B29K 105/10* | (2006.01) |
| *B29C 43/36* | (2006.01) |

(52) U.S. Cl.
CPC ...... *B29C 33/3835* (2013.01); *G06F 17/5009* (2013.01); *B29C 43/36* (2013.01); *B29C 70/46* (2013.01); *B29K 2105/0863* (2013.01); *B29K 2105/101* (2013.01); *G06F 2217/44* (2013.01)

(58) Field of Classification Search
CPC ..... B29C 33/3835; B29C 70/46; B29C 43/36; G06F 17/5009; G06F 2217/44; B29K 2105/0863; B29K 2105/101

USPC .............................................................. 703/1
See application file for complete search history.

(56) References Cited

U.S. PATENT DOCUMENTS

| | | | |
|---|---|---|---|
| 6,327,553 B1* | 12/2001 | Nishiyama .......... | B29C 33/3835 700/100 |
| 2008/0246188 A1* | 10/2008 | Arai .................... | B29C 45/76 264/328.12 |
| 2014/0156237 A1* | 6/2014 | Chang ................ | B29C 45/7693 703/2 |

FOREIGN PATENT DOCUMENTS

CN        101075269 A        11/2007

OTHER PUBLICATIONS

Zheng et al. "Thermoviscoelastic simulation of thermally and pressure-induced stresses in injection moulding for the prediction of shrinkage and warpage for fibre-reinforced thermoplastics". J. Non-Newtonian Fluid Mech. 84 (1999) 159-190.*

Tang et al. "Design and thermal analysis of plastic injection mould". Journal of Materials Processing Technology 171 (2006) 259-267.*

SIPO, Chinese Office Action issued in Chinese Application No. 201610291310.2, dated Nov. 28, 2018.

(Continued)

*Primary Examiner* — Eunhee Kim
(74) *Attorney, Agent, or Firm* — Lorenz & Kopf, LLP

(57) ABSTRACT

Methods and systems are provided for generating a mold. In one embodiment, a method includes: determining, by a processor, a fiber orientation for a plurality of points in a part; determining, by the processor, a distortion value based on the fiber orientations; and generating, by the processor, mold dimensions based on the distortion values.

17 Claims, 4 Drawing Sheets

(56) References Cited

OTHER PUBLICATIONS

Tu, Hengqiang; Xin,Young. Technology of Reverse Deformation and Warpage Analysis of Rear Automotive Lamp Shell. China Plastics. 2012, vol. 26, No. 12, p. 81-86.
SIPO, Chinese Office Action issued in Chinese Application No. 201610291310.2, dated Apr. 13, 2018.
German Patent and Trade Mark Office, Office Action in German Patent Application No. 10 2016 207 821.6 dated Aug. 4, 2017.
M. P. Hartmann et al., "An Approach Towards a Basic Materials Characterization for the Simulation of Process Induced Deformations," The 19th International Conference on Composite Materials, Jul. 28 to Aug. 2, 2013, pp. 1-12.
M. P. Hartmann et al., "Process Induced Deformations—A Study on Sandwich Test Samples," Sample 2014, Jun. 2014, pp. 1-16.
Mathias Hartmann, "Simulation of process induced deformations (spring-back)," Symposium on the occasion of the 5th anniversary of the Institute for Carbon Composites, Sep. 11-12, 2014, pp. 1-30.

* cited by examiner

METHODS AND SYSTEMS FOR MODELING OF DISTORTION IN MOLDED COMPOSITES

CROSS REFERENCE TO RELATED APPLICATIONS

This application claims the benefit of U.S. Provisional Application No. 62/158,961 filed May 8, 2015 which is incorporated herein in its entirety.

TECHNICAL FIELD

The present disclosure generally relates to molded composites, and more particularly relates to methods and systems for modeling of distortion in molded composites.

BACKGROUND

Compression molding is a method of molding in which the molding material, generally preheated, is first placed in an open, heated mold cavity. The mold is closed with a top force or plug member, and pressure is applied to force the material into contact with all mold areas, while heat and pressure are maintained until the molding material has cured (e.g., for thermosets) or cooled (e.g., for thermoplastics).

This method of molding is used in manufacturing automotive parts (e.g., hoods, fenders, scoops, spoilers, as well as smaller more intricate parts) and many other types of parts for various other industries (e.g., other vehicle industries, watercraft industries, industrial industries, toy industries, etc.). In one example, the material to be molded is positioned in the mold cavity and the heated platens are closed by a hydraulic ram. Bulk molding compound (BMC) or sheet molding compound (SMC) are conformed to the mold form by the applied pressure and heated until the curing reaction occurs. SMC feed material usually is cut to conform to the surface area of the mold. The mold is then cooled and the part removed.

In some cases, during the cooling process, the dimensions of the part may change, for example, by shrinking or other distortion. In such cases, the mold must be redesigned to account for the change. Iterative redesigns of the mold can be time consuming and costly. Computer modeling of one more aspects of the design can save time and/or reduce costs.

Accordingly, it is desirable to provide methods and system for generating computer models of a mold. It is further desirable to provide methods and systems for modeling distortion in the computer models. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for generating a mold. In one embodiment, a method includes: determining, by a processor, a fiber orientation for a plurality of points in a part; determining, by the processor, a distortion value based on the fiber orientations; and generating, by the processor, mold dimensions based on the distortion values.

In one embodiment, a system includes a non-transitory computer readable medium. The non-transitory computer readable medium includes a first module that determines, by a processor, a fiber orientation for a plurality of points in a part. The non-transitory computer readable medium further includes a second module that determines, by a processor, a distortion value based on the fiber orientations. The non-transitory computer readable medium further includes a third module that generates, by a processor, mold dimensions based on the distortion values.

DESCRIPTION OF THE DRAWINGS

The present disclosure will hereinafter be described in conjunction with the following drawing figures, wherein like numerals denote like elements, and.

DETAILED DESCRIPTION

Figure 1:
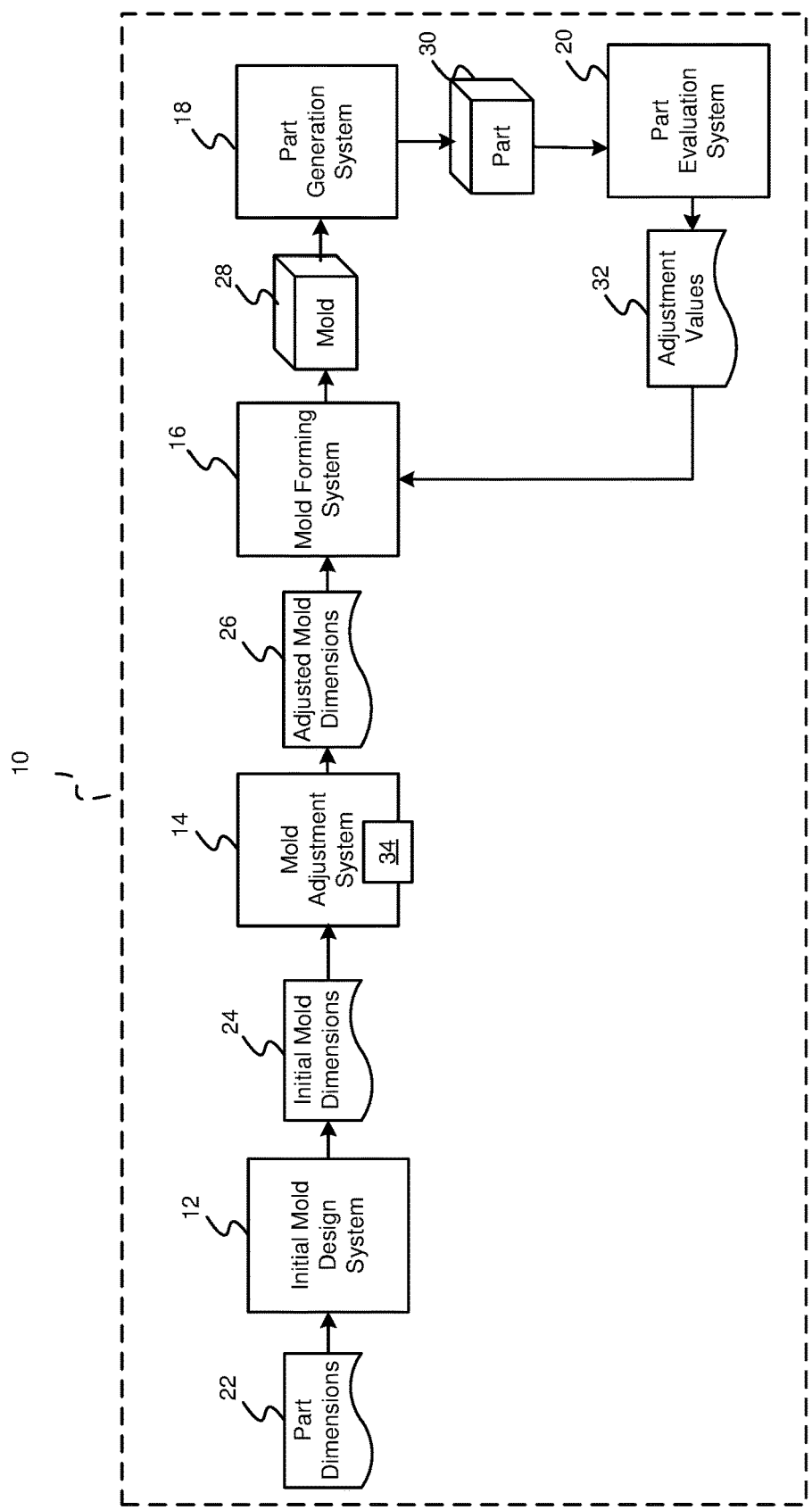
FIG. 1 is a functional block diagram illustrating a mold generation system in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and/or memory that executes or stores one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that exemplary embodiments may be practiced in conjunction with any number of control systems.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Referring now to FIG. 1, a functional block diagram illustrates a mold generation system 10 that performs a mold generation process in accordance with various embodiments. As can be appreciated, the mold generation system 10 generates a mold used for creating parts. The part may be for any industry. For exemplary purposes, examples of this disclosure will be discussed in the context of the mold generation system 10 being used for an automotive part.

As can be appreciated, although the figures shown herein depict an example with certain arrangements of elements, additional intervening elements, devices, features, or components may be present in an actual embodiments. It should also be understood that FIG. 1 is merely illustrative and may not be drawn to any type of scale.

As depicted in FIG. 1, the mold generation system 10 includes an initial mold design system 12, a mold adjustment system 14, a mold forming system 16, a part generation system 18, and a part evaluation system 20. In various embodiments, one or more of the systems 12-20 include a computer having a processor and memory, and software instructions that are implemented on the computer. That is, the software instructions are stored in the memory; and the software instructions are executed by the processor to perform one or more functions of the system. In various embodiments, one or more of the systems 12-20 includes electromechanical components for creating a physical mold or a physical part.

In operation, the mold generation system 10 generates mold dimensions based on desired dimensions of a part. For example, desired part dimensions 22 may be supplied to the initial mold design system 12, after being generated from a computer aided design (CAD) system or other system for designing parts. The initial mold design system 12 generates initial mold dimensions 24 based on the desired part dimensions 22.

The mold adjustment system 14 receives the initial mold dimensions 24. The mold adjustment system 14 adjusts the initial mold dimensions 24 to compensate for predicted distortion and/or actual distortion that occurs in the part after the part has been formed. The adjusted mold dimensions 26 are provided to the mold forming system 16. The mold forming system 16 generates a physical mold 28 based on the adjusted mold dimensions 26.

The part generation system 18 uses the physical mold 28 to form a physical part 30. In various embodiments, the part generation system 18 places a lower part of the mold 28 on a support structure; the material to be molded is positioned in a mold cavity of the lower mold 28. An upper part of the mold 28 is lowered to the lower part of the mold, thereby applying heat and pressure to the material until a curing reaction or solidification due to cooling occurs. The part 30 is removed.

The part evaluation system 20 receives the molded part 30 and evaluates the part 30. In particular, the part evaluation system 20 compares the actual dimensions of the part 30 to the desired part dimensions 22. The part evaluation system 20 provides feedback to the mold forming system 16 and/or the mold adjustment system 14 based on any deviations from the initial part design that occur. For example, the part evaluation system 20 provides adjustment values 32 to the mold forming system 16 or the mold adjustment system 14 to further adjust the mold dimensions to compensate for the changes.

In various embodiments, the mold adjustment system 14 includes a distortion prediction system 34. The distortion prediction system 34 is a computer based system for predicting distortion of a part. The distortion prediction system 34 predicts the distortion based on estimated mechanical and thermal properties of the part. The distortion prediction system 34 estimates the mechanical and thermal properties based on determined fiber orientations of the composite material of the part. The distortion prediction system 34 determines the fiber orientations using, for example, affine transformation methods, or other methods.

The predicted distortion is then used by the mold adjustment system 14 to adjust the initial mold dimensions 24. For example, the initial mold dimensions 24 are adjusted in a direction that is opposite of the predicted distortion. By including the distortion prediction system 34 in the mold adjustment system 14 and predicting the distortion of a part before the part 30 is generated, the number of iterations through the mold generation process is reduced, thereby saving time and reducing cost.

Figure 2:
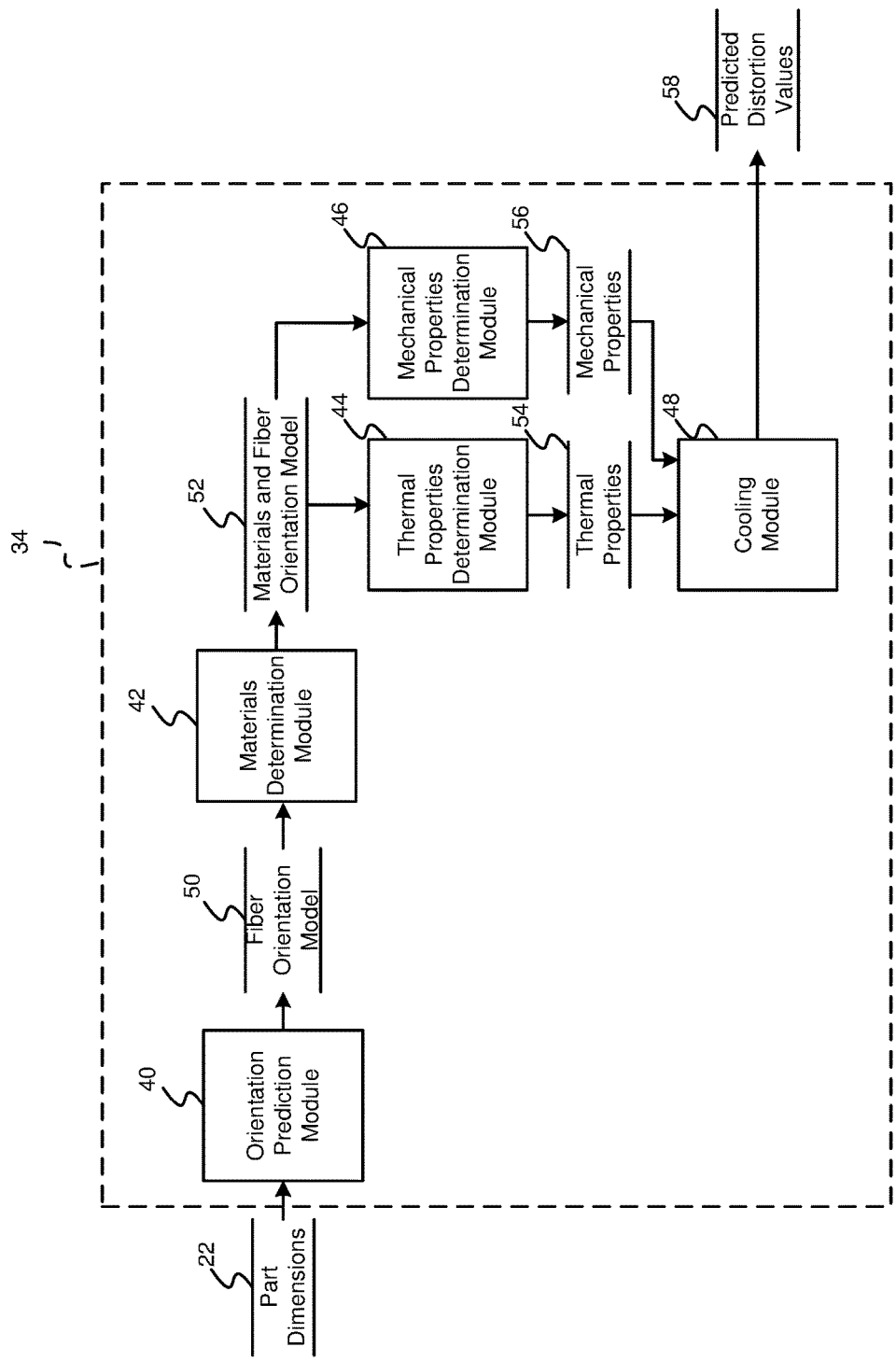
FIG. 2 is a functional block diagram illustrating a distortion prediction system of the mold generation system in accordance with various exemplary embodiments.

Referring now to FIG. 2 and with continued reference to FIG. 1, a functional block diagram illustrates various embodiments of the distortion prediction system 34. Various embodiments of the distortion prediction system 34 according to the present disclosure may include any number of sub-modules. As can be appreciated, the sub-modules shown in FIG. 2 may be combined and/or further partitioned to similarly predict the distortion of a part. In various embodiments, the distortion prediction system 34 includes an orientation prediction module 40, a materials modeling module 42, a thermal properties determination module 44, a mechanical properties determination module 46, and a cooling module 48.

Figure 3A:
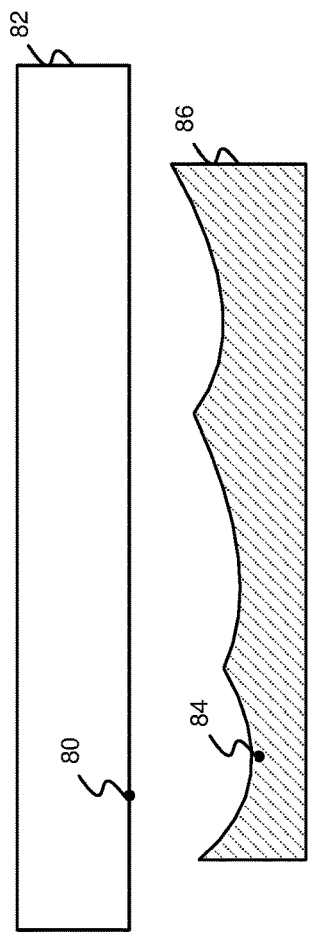
FIGS. 3A and 3B are illustrations of a material and a mold in accordance with various exemplary embodiments.
Figure 3B:
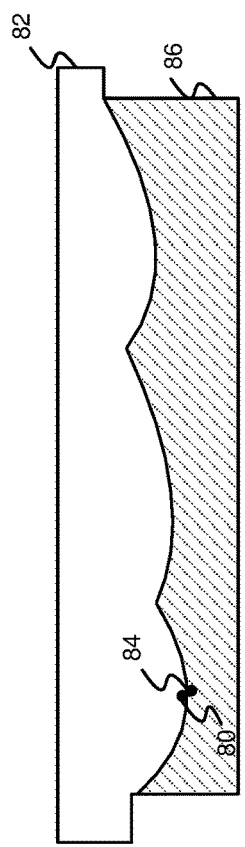

The orientation prediction module 40 receives as input the desired part dimensions 22 and the initial mold dimensions 24. Given the desired part dimensions 22 and the initial mold dimensions 24, the orientation prediction module 40 generates a fiber orientation model 50, indicating a fiber orientation for each point (or a subset of points) in the part. For example, as show in FIGS. 3A and 3B, the orientation prediction module 40 determines a point 80 in a flat sheet of material 82 (composite material to be molded) and maps the point 80 to a point 84 in the mold 86. The orientation prediction module 40 then determines the fiber orientation of the material when shaped at that point 84 based on an affine transformation computed between the two points 80 and 84. The fiber orientation for that point is then mapped to the points of the part. The fiber orientation model 50 then includes the mapped fiber orientation of each point (or a subset of points) of the part.

The materials modeling module 42 receives as input the fiber orientation model 50. The materials modeling module 42 determines material properties of each point (or a subset of points) of the part. For example, the materials modeling module determines material values representing, for example, a thickness, a density, a strength, a ductility, a hardness, or other properties for each point (or a subset of points) of the part. The materials modeling module 42 generates a materials and fiber orientation model 52 that associates the material values with the fiber orientation for each point (or subset of points) of the part.

The thermal properties determination module 44 receives as input the materials and fiber orientation model 52. The thermal properties determination module 44 computes thermal properties 54 for the part based on the material values and the fiber orientation defined in the materials and fiber orientation model 52. For example, the Schapery model or other model can be used to calculate thermal expansion properties of a composite material from constituent properties and the fiber orientation state.

The mechanical properties determination module 46 receives as input the materials and fiber orientation model 52. The mechanical properties determination module 46 computes various mechanical properties 56 based on the material values and the fiber orientations defined in the materials and fiber orientation model 52. For example, various micromechanics models including those from Halpin-Tsai, Mori-Tanaka, etc. can be used to calculate mechanical properties of a composite material from constituent properties and the local fiber orientation state.

The cooling module 48 receives the estimated thermal properties 54, the estimated mechanical properties 56, and mesh data representing a final part. The cooling module 48 generates one or more predicted distortion values 58 based on the estimated thermal properties 54, the estimated mechanical properties 56, the mesh data representing the final part, and one or more cooling techniques. For example, the thermal properties 54, and air heat transfer coefficients are provided to a cooling method that predicts distortion values based on a cooling of the part in the air. In another example, the thermal properties 54, and air and steel heat transfer coefficients are provided to a cooling method that predicts distortion values based on a cooling of the part in contact with the mold on one side. In another example, the thermal properties 54, and steel heat transfer coefficients are provided to a cooling method that predicts distortion values based on a cooling of the part in contact with the mold on both sides. In another example, the mechanical properties 56 are provided to a cooling method that predicts final distortion values based on a cooling of the part in a free state. The cooling methods in practice may be a combination of all the above methods as an initial charge is heated, molded and cooled to produce the final desired part. As can be appreciated, other commonly known cooling methods may be implemented in various embodiments.

Figure 4:
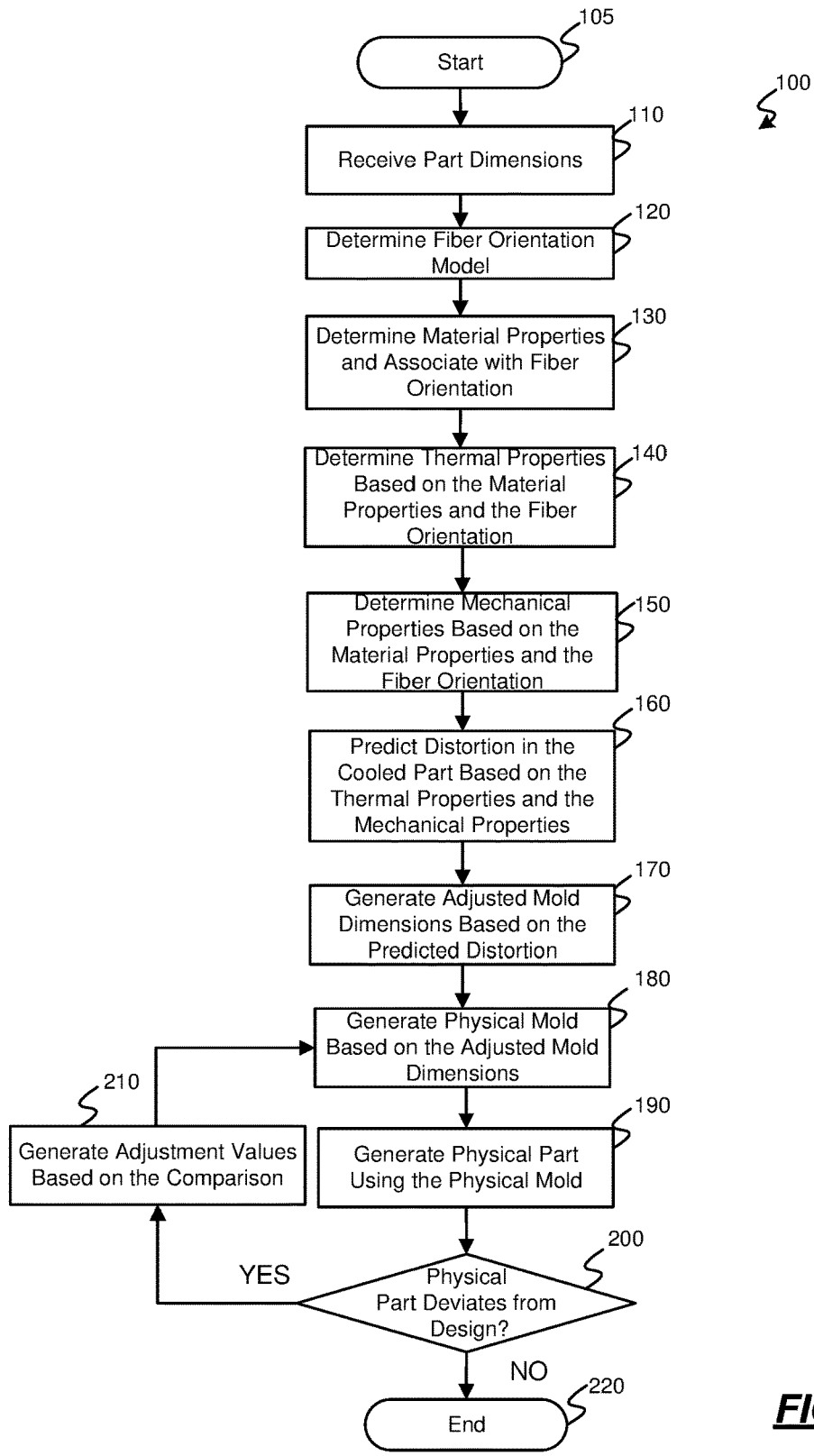
FIG. 4 is a flowchart of a method for generating a mold in accordance with various exemplary embodiments.

Referring now to FIG. 4, and with continued reference to FIGS. 1 and 2, a flowchart illustrates a method 100 that can be performed by the mold generation system 10 in accordance with various embodiments. As can be appreciated in light of the disclosure, the order of operation within the method is not limited to the sequential execution as illustrated in FIG. 4, but may be performed in one or more varying orders as applicable and in accordance with the present disclosure.

In one example, the method may begin at 105. The part design including the desired part dimensions 22 (e.g., two-dimensional, three-dimensional, etc.) is received at 110. The fiber orientation for each point (or a certain number of points) in the part design is determined and the fiber orientation model is generated at 120. If, the part design is provided in two dimensions, the determined fiber orientations for each point in two dimensions is mapped to three dimensions as a sub step of 120.

The material properties for each point (or a certain number of points) in the part are determined and mapped to the fiber orientation at 130. The thermal properties of the part are then estimated based on the fiber orientation and the material properties at 140. The mechanical properties of the part then estimated based on the fiber orientation and the material properties at 150. The thermal properties and the mechanical properties are then used to predict distortion in the part at 160.

The predicted distortion values are then used to determine the adjusted mold dimensions 26 at 170. The physical mold 28 is produced at 180 based on the adjusted mold dimensions 26. A part 30 is produced using the physical mold 28 at 190. The part 30 is cooled or cured and evaluated based on the original part design at 200. If the part 30 deviates from the original part design at 200, the part 30 is evaluated and the adjustment values 32 are determined at 210. The new adjustment values 32 are used to generate new adjusted mold dimensions 26 at 170.

The method continues to iterate through steps 170-200 until the part 30 does not deviate (or the deviation is less than a predetermined value) from the original part design at 210. Once the part does not deviate from the original part design (or the deviation is less than a predetermined value) at 200, the mold design process 100 is complete, and the method may end at 220.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A computer implemented method for generating a mold for compression molding, comprising:
   determining, by a processor, a first point of a flat sheet to be molded;
   mapping, by the processor, the first point of the flat sheet to a second point of the mold;
   determining, by a processor, a fiber orientation based on the mapping;
   mapping, by the processor, the second point of the mold to a third point of a part;
   associating, by the processor, the fiber orientation with the third point;
   determining, by the processor, a distortion value based on the fiber orientation;
   generating, by the processor, mold dimensions based on the distortion value; and
   generating a second mold based on the mold dimensions.

2. The method of claim 1, wherein the determining the fiber orientation is based on an affine transformation between the first point in the flat sheet and the second point in the mold.

3. The method of claim 1, further comprising:
   determining at least one material property of the third point of the part, and wherein the determining the distortion value is further based on the material property.

4. The method of claim 1, further comprising:
   determining a thermal property of the third point of the part, and wherein the determining the distortion value is further based on the thermal property.

5. The method of claim 1, further comprising: determining a mechanical property of the third point of the part, and wherein the determining the distortion value is further based on the mechanical property.

6. The method of claim 1, wherein the determining the distortion value is based on a cooling method.

7. The method of claim 6, wherein the cooling method predicts distortion based on a cooling of the part at least one of in the air, in contact with the mold on one side, in contact with the mold on both sides, and in a free state.

8. The method of claim 1, further comprising:
   determining at least one thermal value for each point of the plurality of points;
   determining at least one mechanical property for each point of the plurality of points; and determining the distortion values based on a cooling method that is based on the thermal values, the mechanical properties.

9. The method of claim 1, wherein the mold dimensions adjust the mold in a direction that is opposite of the distortion value.

10. A system for generating a mold for compression molding, comprising:
a non-transitory computer readable medium comprising:
a first module that, by a processor, determines a first point of a flat sheet to be molded, maps the first point of the flat sheet to a second point of the mold, and determines a fiber orientation based on the mapping;
a second module that, by a processor, maps the second point of the mold to a third point of a part, associates, the fiber orientation with the third point, and determines a distortion value based on the fiber orientation; and
a third module that generates, by a processor, mold dimensions for adjusting dimensions of the mold based on the distortion values.

11. The system of claim 10, wherein first module determines the fiber orientation based on an affine transformation between the first point in the flat sheet and the second point in the mold.

12. The system of claim 10, further comprising:
a fourth module that determines at least one material property of the third point of the part, and wherein the second module determines the distortion value based on the material property.

13. The system of claim 10, further comprising:
a fifth module that determines a thermal property of the third point of the part, and wherein the second module determines the distortion value based on the thermal property.

14. The system of claim 10, further comprising:
a sixth module that determines a mechanical property of the third point of the part, and wherein the second module determines the distortion value based on the mechanical property.

15. The system of claim 10, wherein the second module determines the distortion value based on a cooling method.

16. The system of claim 15, wherein the cooling method predicts distortion based on a cooling of the part at least one of in the air, in contact with the mold on one side, in contact with the mold on both sides, and in a free state.

17. The system of claim 10, further comprising:
a fifth module that determines at least one thermal value of the first point of the flat sheet;
a sixth module that determines at least one mechanical property of the first point of the flat sheet, and
wherein the second module determines the distortion values based on a cooling method that is based on the thermal values, and the mechanical properties.

* * * * *